United States Patent [19]

Babuder

[11] Patent Number: 5,135,269
[45] Date of Patent: Aug. 4, 1992

[54] TUBE COUPLING

[75] Inventor: Gerald A. Babuder, Mentor, Ohio

[73] Assignee: Cajon Company, Macedonia, Ohio

[21] Appl. No.: 549,897

[22] Filed: Jul. 9, 1990

[51] Int. Cl.$^5$ ............................................. F16L 19/02
[52] U.S. Cl. .................................... 285/328; 285/329; 285/334.2; 285/378; 285/917; 277/167.5; 277/236
[58] Field of Search ...................... 285/353, 332.2, 917, 285/328, 354, 334.4, 378, 329; 277/167.5, 236

[56]           References Cited
          U.S. PATENT DOCUMENTS

| | | |
|---|---|---|
| H439 | 3/1988 | Rehn et al. . |
| 401,262 | 4/1889 | Frisbie ........................ 285/354 X |
| 1,242,568 | 10/1917 | Loughridge et al. . |
| 1,715,854 | 6/1929 | McKenzie-Martyn . |
| 1,825,774 | 10/1931 | Boynton . |
| 1,834,581 | 12/1931 | Ferrell et al. ................... 285/917 X |
| 2,528,665 | 11/1950 | Peterson et al. . |
| 2,926,937 | 3/1960 | Parsons . |
| 2,937,891 | 5/1960 | Gressel . |
| 3,100,656 | 8/1963 | MacArthur ................. 277/167.5 X |
| 3,211,478 | 10/1965 | Barzer ............................. 277/236 |
| 3,368,818 | 2/1968 | Asamaki et al. . |
| 3,503,634 | 3/1970 | Cadiou . |
| 3,514,133 | 5/1970 | Besse . |
| 3,521,910 | 7/1970 | Callahan et al. ............... 285/328 X |
| 3,989,285 | 11/1976 | Yancey . |
| 4,616,860 | 10/1986 | Faria et al. . |
| 4,650,227 | 3/1987 | Babuder et al. ............... 285/917 X |
| 4,705,307 | 11/1987 | Chelette . |
| 4,854,597 | 8/1989 | Leigh . |
| 5,066,051 | 11/1991 | Weigl et al. ....................... 285/328 |
| 5,067,753 | 11/1991 | Porel ................................. 285/279 |

FOREIGN PATENT DOCUMENTS

| | | |
|---|---|---|
| 2553058 | 8/1976 | Fed. Rep. of Germany . |
| 2948286 | 6/1980 | Fed. Rep. of Germany . |
| 1495732 | 9/1967 | France . |
| 8903495 | 4/1989 | World Int. Prop. O. . |

OTHER PUBLICATIONS

Soviet Inventions Illustrated P.Q. Sections, Week 8616 May 18, 1986.

Primary Examiner—Randolph A. Reese
Assistant Examiner—Heather Chun
Attorney, Agent, or Firm—Fay, Sharpe, Beall, Fagan, Minnich & McKee

[57]           ABSTRACT

A tube or pipe coupling joint structure comprises a pair of spaced flange members adapted for relative movement toward each other along a longitudinal axis. Each of the flange members has a face surface which is generally a surface of revolution about the longitudinal axis with the face surfaces on the respective flange members being located in opposed relationship to each other. A relatively smooth thin metal gasket is positioned between the opposed face surfaces of the flange members and each of the face surfaces comprises a sealing protrusion and a stop surface for limiting penetration of the sealing protrusion into the gasket. Moreover, each sealing protrusion is a circumferentially continuous flat and polished narrow sealing band of narrow width lying in a plane which is normal or deviates from normal to the longitudinal axis by no more than about 1 to 3 degrees. Each stop surface lies radially outward of the associated sealing band and is inclined at an angle in the range of 3 to 15 degrees relative to a plane normal to the longitudinal axis. The radially innermost portion of each stop surface is circumferentially continuous and is located axially behind the plane of the associated sealing band a predetermined distance.

15 Claims, 2 Drawing Sheets

TUBE COUPLING

BACKGROUND OF THE INVENTION

The subject invention is directed toward the art of tube or pipe joints and couplings and, more particularly, to a metal gasket or seal coupling arrangement. The invention is especially suited for use in high vacuum systems and will be described with reference thereto; however, as will become apparent, the invention could be used in a variety of types of pressure and vacuum systems.

The typical coupling used in vacuum systems comprises opposed flanges with axially extending circumferential beads or protuberances arranged to engage with the opposite faces of a thin metallic gasket. During joint make-up, the flanges are driven axially together causing the beads to penetrate the gasket and form a seal therewith. The degree of bead penetration must be relatively closely controlled to produce a good seal. For example, if penetration is inadequate, an effective seal is not produced. Similarly, if penetration is too deep, it is possible to cut through the gasket and totally lose the seal.

The forces required to produce the proper penetration tend to vary widely depending upon the specific size and cross-sectional configuration of the protuberance, as well as, the gasket material. As the forces increase, the components of the coupling body must be made increasingly heavier to handle the increased forces. Attempts at reducing the forces required to produce the necessary penetration have often resulted in a fitting wherein there is no distinct point at which the fitting has a "feel" of final make-up.

The problem with this lack of a distinct "feel" is that the person making-up the joint will sometimes continue tightening the coupling components until cutting through the gasket results.

In addition to the above noted difficulties, the prior sealing face designs sometimes result in producing a seal in which the seal components produce entrapment areas or pockets wherein particles can accumulate. In many current processing systems, such entrapment areas are totally unacceptable.

SUMMARY OF THE INVENTION

The subject invention overcomes the above discussed problems and provides an improved coupling or joint structure assembly especially suited for use in vacuum systems and generally comprising a pair of spaced flange members adapted for relative movement toward each other along a longitudinal axis. Each of the flange members has a face surface generally normal to the longitudinal axis and a smooth metal gasket is positioned normal to the longitudinal axis between the face surfaces of the flange members. Sealing protrusions extend outwardly from each of the facing surfaces of the flange members and sealingly engage with the metal gasket. According to the invention, each of the protrusions generally comprises a flat and circumferentially continuous sealing band lying substantially normal to the axis with the protrusions on each flange positioned in aligned opposed relationship on opposite sides of the gasket. Each sealing band has a radial width w and the flange face surface radially outwardly of each sealing band constitutes a stop surface for limiting penetration of the sealing surface into the gasket. The stop surface is inclined away from the gasket by an angle in the range of 3° to 15°. Preferably, and in accordance with a somewhat more limited aspect of the invention, the sealing band is located at a distance d in the range of 0.002 to 0.012 inches axially outward from the stop surface portion which is radially closest to the sealing band.

Preferably, and in accordance with a further aspect of the invention, the sealing bands connect to their associated stop surface with an arcuate transition surface.

Preferably, and in accordance with yet another aspect of the invention, the radially innermost portion of the sealing bands extend axially outward a distance at least as great as the remaining portions of the associated sealing band such that the sealing band is normal or inclined relative to the longitudinal axis at an angle no greater than 3° relative to the normal.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENTS

Figure 1:
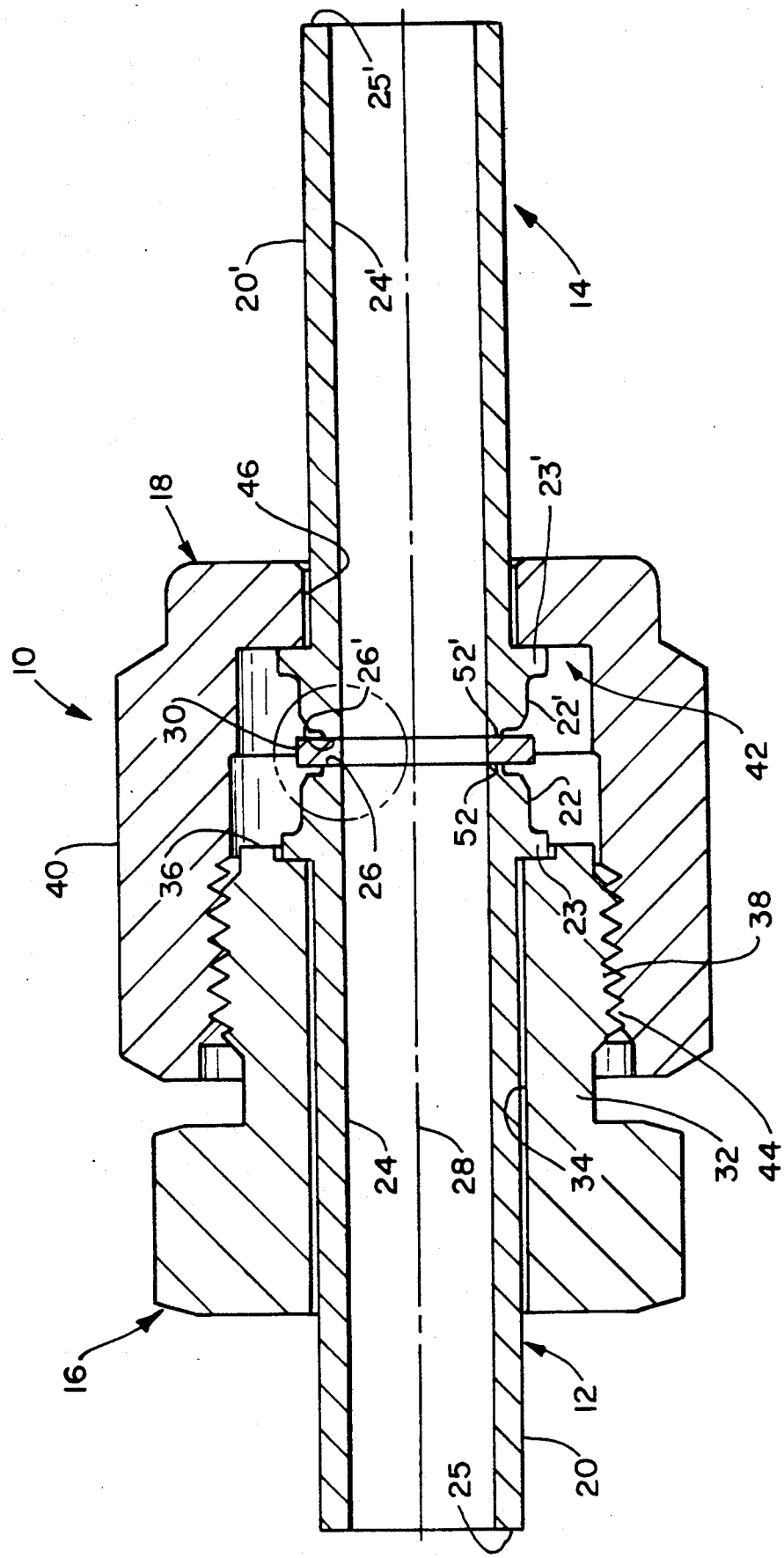
FIG. 1 is a longitudinal cross-sectional view through a tube coupling which incorporates the features of the subject invention.

Referring more particularly to the drawings wherein the showings are for the purpose of illustrating a preferred embodiment of the invention only, and not for the purpose of limiting same, FIG. 1 shows the overall arrangement of a coupling assembly 10 particularly suited for joining tubing in either vacuum or pressure systems. As illustrated, the coupling assembly 10 could take a variety of specific configurations and structural arrangements but, in the subject embodiment, it is shown as comprising a pair of substantially identical tube coupling components 12 and 14 which are joined in the aligned mated relationship shown by a cooperating pair of threaded nut members 16 and 18. As shown, the first coupling component 12 includes first and second cylindrical sections 20 and 22 which have a centrally extending through passage 24. The first coupling component 12 terminates in first and second end faces 25 and 26, respectively. In the embodiment under consideration, each of the first and second end faces 25, 26 are substantially perpendicular to the axis 28 of the passageway 24.

In the embodiment under consideration, the end face 25 is intended to be butt welded to an associated fluid line. It should, of course, be understood that other types of end fittings or connectors could be used to join the associated lines to the coupling member 12.

The second coupling component 14 is, in this embodiment, identical to the first coupling component 12. Accordingly, it has been identified with the same reference numerals used with respect to the coupling component 12 but differentially therefrom through the addition of prime suffixes.

The tube coupling components 12 and 14 are retained in their aligned relationship and driven axially toward one another to sealingly engage on opposite sides of a thin annular metal gasket 30. The means for maintaining the coupling members 12 and 14 in the relationship shown and producing the required axially directed sealing forces comprise the previously-mentioned conventional threaded nut means 16 and 18. The first nut member 16 has a somewhat cylindrical body 32 with a central, axially extending passage 34 formed therethrough. Passage 34 is only slightly larger in diameter than the exterior of the cylindrical section 20 so that the coupling member 12 can be closely and freely received therein. The left-hand end of the member 16 has a generally hex configuration so that it can be gripped with a suitable wrench for threadingly driving it into engagement with member 18. The right-hand end of the member 16 is provided with an end face 36 having a counterbored section to receive a radially extending flange 23 formed on the coupling member 12 between the cylindrical sections 20, 22. The exterior of the cylindrical section 32 of member 16 is provided with suitable threads 38 which cooperate with the threaded member 18. In this embodiment, member 18 comprises a female nut having a hexagonal exterior 40 and an inwardly open chamber section 42 which is provided with threads 44 adjacent its left-hand or inlet end. The right-hand end of the member 18 is provided with an opening 46 sized to receive the cylindrical section 20' of coupling member 14. This allows the bottom of the chamber 42 to act against the flange 23' such that during tightening of the coupling nut 16 and 18 the end faces 26 and 26' of the coupling members 12 and 14, respectively, are driven into sealing engagement with the opposite faces of the annular metal gasket 30.

The general coupling components thus far described are relatively conventional and well-known. Additionally, it should be understood that additional structure is sometimes included in these particular types of coupling. For example, as shown in the commonly assigned co-pending application Ser. No. 468,691, filed Jan. 23, 1990, and entitled "Anti-Twist Coupling Assembly," various drive members or anti-torque members can be incorporated to prevent transmission of torque from the coupling nuts to the sealing end faces of the coupling members. Likewise, it is well-known to provide various forms of gasket retaining devices to locate and retain the gasket 30 in proper position relative to the sealing end faces during assembly and disassembly of the coupling. Such additional features and structures can obviously be included with the subject coupling. The feature of particular importance to the subject invention is, however, the particular shape and arrangement of the sealing rib and sealing end face provided on the end faces 26, 26' of the coupling components 12 and 14.

As noted, the feature of importance to the subject invention is the design of the sealing end faces and the sealing rib which enters into and engages the metallic gasket when the nut members are tightened. In the past, a typical sealing rib or protrusion has comprised a semi-circular bead formation. Alternatively, many such couplings have used a somewhat sharp-edged, V-shaped rib. With both of these two prior standard designs, there has been difficulty in assuring proper make-up of the coupling and/or in providing a proper feel so that the assembler recognizes when make-up is complete or has been sufficiently carried out. In fact, under certain environments, it has been possible to inadvertently drive the sealing bead completely through the gasket.

Figure 2:
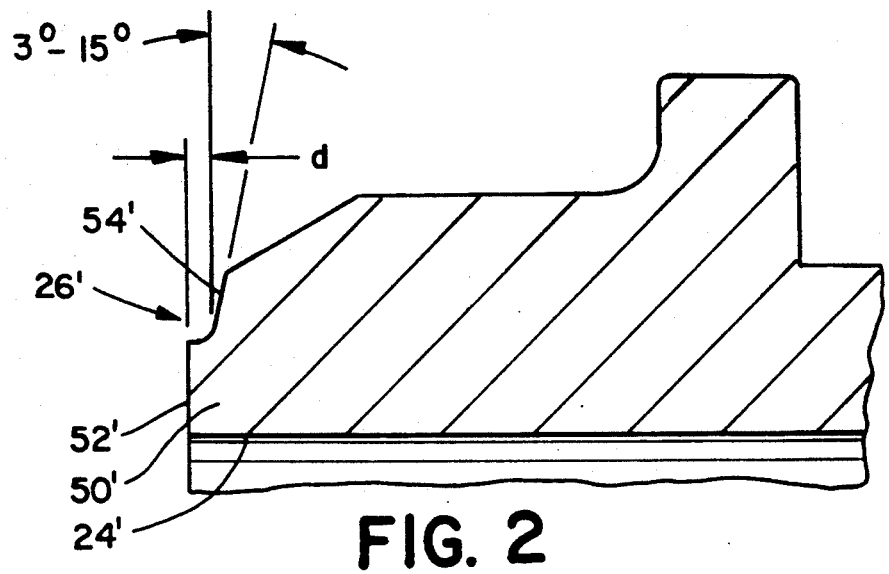
FIG. 2 is an enlarged cross-sectional view showing the sealing rib configuration.
Figure 3:
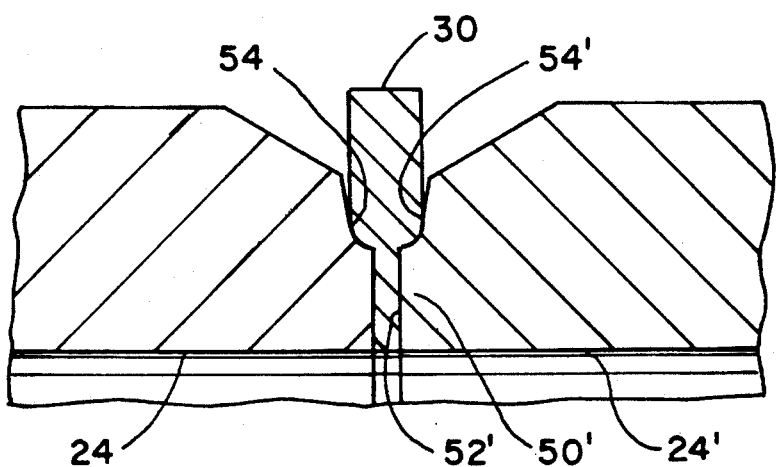
FIG. 3 is an enlarged view of the circled area of FIG. 1.

The subject sealing rib of the subject invention is arranged so that it provides a design wherein the forces required for make-up are not unduly high and, further, a distinct feel is provided to assure that the assembler knows when make-up or proper sealing has been achieved. Because the forces are generally less, the sizes of the coupling nuts and associated structure can be somewhat reduced. Referring in particular to FIGS. 2 and 3, the preferred form for the annular sealing rib is shown in detail. As illustrated therein, the sealing face 26' has a circumferentially extending sealing rib 50' positioned closely adjacent the central passage 24'. As shown in FIG. 3, this assures that sealing takes place close to the bore line of passage 24'. This is desirable since it reduces fluid entrapment areas and provides a smooth flow area through the coupling.

Figure 4:
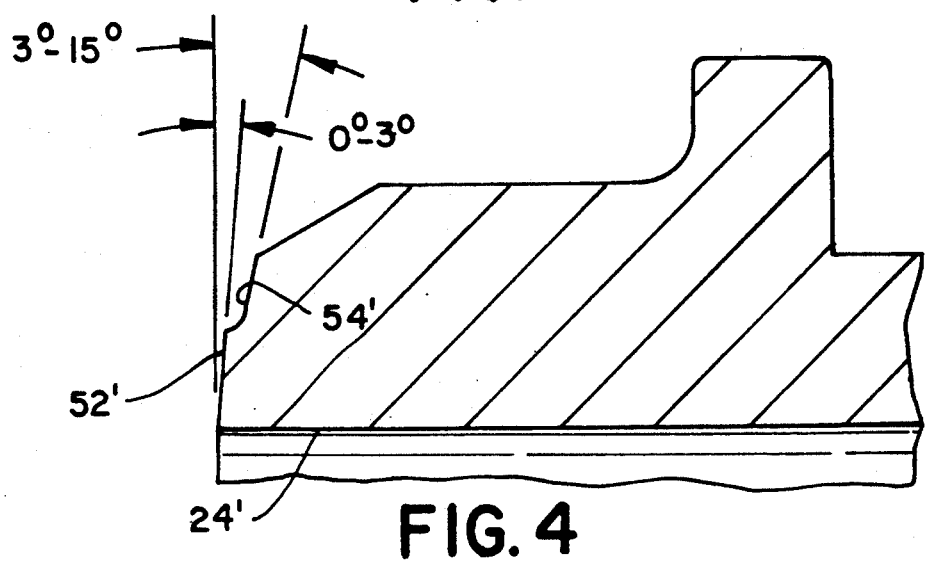
FIG. 4 is a view like FIG. 2 but showing a modified form of sealing rib construction.

In the preferred embodiment, the annular sealing rib 50 has a substantially flat outer sealing surface 52 which is circumferentially and radially continuous and has a radial extent in the range of 0.015 to 0.035 inches in width. With this width, the subject design reduces the force required to produce sealing penetration of the face into the associated gasket 30 by about 15% to 50% compared to most prior designs. For further example, with such a fitting suitable for one-quarter inch tubing, the inner edge of the sealing surface 52' is preferably located on a diameter of 0.182 inches and the outer periphery of the sealing surface 52' is located on a diameter of 0.227 inches so that the band has a width of 0.023 inches. As previously discussed, the sealing surface 52' is preferably in a plane which is perpendicular to the axis of the flow passage 24'. Alternatively, however, and as shown in FIG. 4, it is possible for this surface to be inclined from one degree up to as much as three degrees from perpendicular. That is, the innermost edge can extend axially outward beyond the remaining sealing surface and the sealing surface has the general shape of a very shallow truncated cone.

By making the sealing surface with the one to three degree incline, the opposed surfaces 52, 52' can be brought into direct engagement and no permanent deformation of the surfaces occurs up to the point that they have compressed into full engagement. Thus, with proper use, these components can withstand many makeups without damage to the seal surfaces.

Associated with the sealing surface 52' and lying radially outwardly therefrom is a second circumferentially continuous surface 54' which functions as a stop surface to limit penetration of the sealing surface into the associated gasket and to provide a rapid buildup in force to produce a distinct feel when proper sealing make-up has been achieved. This stop surface 54' is preferably inclined in the manner shown at an angle of 10 degrees but angles in the range of approximately 3 to 15 degrees from a plane perpendicular to the axis of passage 24' can be used. Thus, when surface 52 has penetrated the gasket 30 to a predetermined depth, the surface 54' comes into engagement with the gasket surface and the forces required to produce penetration increase drastically. If the angle significantly exceeds 15°, penetration to the surface 54' does not result in a distinct feel with respect to proper tightening and overtightening is possible. Preferably, the distance d from the surface 52' to the start of surface 54' is in the range of 0.004 to 0.006 inches but a range 0.002 inches to 0.012 inches appears to be satisfactory for most situations. This assures sufficient penetration to provide a proper seal. Preferably, the sealing bands have a surface finish in the range of 1 to 5 $\mu$ inches $R_A$.

The invention has been described with reference to the preferred and alternative embodiments. Obviously, modifications and alterations will occur to others upon a reading and understanding of this application. It is intended to include all such modifications and alterations in so far as they come within the scope of the appended claims or the equivalents thereof.

What is claimed is:

1. A joint structure especially suited for vacuum systems comprising:
a pair of spaced flange members adapted for relative movement toward each other along a longitudinal axis, each of the flange members having a sealing face surface generally normal to the longitudinal axis;
means for joining the spaced flange members in aligned relationship and moving them toward one another along the longitudinal axis;
a smooth metal gasket positioned normal to the longitudinal axis between the sealing face surfaces of the flange members; and
a sealing protrusion extending outwardly from each of the sealing face surfaces of the flange members and sealingly engaged with the metal gasket, each said protrusion comprising a generally flat and circumferentially continuous sealing band generally normal to said axis with the protrusions on each flange positioned in aligned opposed relationship on opposite sides of the gasket, each sealing band having a radial width w and the flange sealing face surface radially outward of each sealing band constituting a stop surface for limiting penetration of said sealing face surface into said gasket and being inclined axially away from the gasket by an angle in the range of 3 to 15 degrees, said sealing band being located at a distance in the range of 0.002 to 0.12 inches axially outward from the stop surface portion which is radially closest to the sealing band.

2. A joint structure as defined in claim 1 wherein a cylindrical flow passage extends axially through the sealing face surface of said flange member and wherein said sealing protrusions are located circumferentially about and closely adjacent the respective flow passage.

3. A joint structure as defined in claim 1 wherein said sealing bands connect to their associated stop surface with an arcuate transition surface.

4. A joint structure as defined in claim 1 wherein said sealing bands have a surface finish in the range of 1 to 5 $\mu$ inches $R_A$.

5. A joint structure as defined in claim 1 therein said continuous sealing band is inclined from normal to said axis by no more than three degrees.

6. A joint structure comprising:
a pair of spaced flange members adapted to relative movement toward each other along a longitudinal axis, each of the flange members having a sealing face surface which is generally a surface of revolution about the longitudinal axis and the face surfaces on the respective flange members being located in opposed relationship to each other;
means for joining the spaced flange members in aligned relationship and moving them toward one another along the longitudinal axis;
said sealing face surface of each flange member comprised of a sealing protrusion and a stop surface for limiting penetration of the sealing protrusion into the gasket, each sealing protrusion comprising a circumferentially continuous flat and polished narrow sealing band of a width "w" which is in a plane which deviates from the normal to the longitudinal axis nor more than 1 to 3 degrees, each stop surface lying radially outward of the associated sealing band and being inclined at an angle in the range of 3 to 15 degrees relative to a plane normal to the longitudinal axis, the radially innermost portion of each stop surface being circumferentially continuous and located axially behind the plane of the associated sealing band a distance "d" in relation to the gasket.

7. A joint structure as set forth in claim 6 wherein each sealing band and its associated stop surface are joined by an arcuate transition surface.

8. A joint structure as set forth in claim 6 wherein distance "d" is at least 0.002 inches.

9. A joint structure as set forth in claim 8 wherein distance "d" is not significantly greater than 0.012 inches.

10. A joint structure as set forth in claim 9 including a threaded coupling nut for moving the flange members toward each other.

11. A joint structure as set forth in claim 6 wherein each said sealing face surface includes a flow passage of circular cross-section extending therethrough and wherein said sealing band of each sealing protrusion is positioned closely encircling the respective flow passage in the associated flange face.

12. A joint structure as set forth in claim 11 wherein the sealing band on each sealing face surface extends axially outward to a maximum distance adjacent the flow passage.

13. A joint structure especially suited for vacuum systems comprising:
a pair of spaced flange members adapted for relative movement toward each other along a longitudinal axis, each of the flange members having a sealing face surface generally normal to the longitudinal axis;
means for joining the spaced flange members in aligned relationship and moving them toward one another along the longitudinal axis;
a smooth metal gasket positioned normal to the longitudinal axis between the sealing face surfaces of the flange member; and
a sealing protrusion extending outwardly from each of the sealing facing surfaces of the flange members and sealingly engaged with the metal gasket, each said protrusion comprising a generally flat and circumferentially continuous sealing band generally normal to said axis with the protrusions on each flange positioned in aligned opposed relationship on opposite sides of the gasket, each sealing band having a radial width w and the flange sealing face surface radially outward of each sealing band constituting a stop surface for limiting penetration of said sealing face surface into said gasket and being inclined axially away from the gasket by an angle in the range of 3 to 15 degrees, said sealing band being located at a distance d axially outward from the stop surface portion which is radially closest to the sealing band, said sealing bands connected to their associated stop surface with an arcuate transition surface.

14. A joint structure comprising:

a pair of spaced flange members adapted for relative movement toward each other along a longitudinal axis, each of the flange members having a sealing face surface which is generally a surface of revolution about the longitudinal axis and the face surfaces on the respective flange members being located in opposed relationship to each other;

means for joining the spaced flange members in aligned relationship and moving them toward one another along the longitudinal axis;

a relatively smooth thin metal gasket positioned between the opposed sealing face surfaces of the flange member; and said sealing face surface of each flange member comprised of a sealing protrusion and a stop surface for limiting penetration of the sealing protrusion into the gasket, each sealing protrusion comprising a circumferentially continuous flat and polished narrow sealing band of a width "w" which is in a plane which deviates from normal to the longitudinal axis no more than 1 to 3 degrees, each stop surface lying radially outward of the associated sealing band and being inclined at an angle in the range of 3 to 15 degrees relative to a plane normal to the longitudinal axis, the radially innermost portion of each stop surface being circumferentially continuous and located axially behind the plane of the associated sealing band a distance "d" in relation to the gasket, each sealing band and its associated stop surface joined by an arcuate transition surface.

15. A joint structure as set forth in claim 14 wherein distance "d" is at least 0.002 inches but not significantly greater than 0.012 inches.

* * * * *